US008413369B1

(12) United States Patent
Neymeyer

(10) Patent No.: US 8,413,369 B1
(45) Date of Patent: Apr. 9, 2013

(54) METHOD AND DEVICE FOR HALTING MOLE TUNNELING ACTIVITY

(76) Inventor: Calvin E. Neymeyer, Clinton, IA (US)

( * ) Notice: Subject to any disclaimer, the term of this patent is extended or adjusted under 35 U.S.C. 154(b) by 0 days.

(21) Appl. No.: 13/094,689

(22) Filed: Apr. 26, 2011

Related U.S. Application Data

(60) Provisional application No. 61/328,176, filed on Apr. 26, 2010, provisional application No. 61/392,527, filed on Oct. 13, 2010.

(51) Int. Cl.
*A01M 29/30* (2011.01)
*A01M 29/00* (2011.01)
*A01M 23/36* (2006.01)

(52) U.S. Cl. .................. 43/77; 43/80; 43/124

(58) Field of Classification Search .............. 43/77–80, 43/124, 132.1, 1; 47/1.01 R, 1.01 F, 32; 52/101; 172/21, 378, 379; 473/497, 499
See application file for complete search history.

(56) References Cited

U.S. PATENT DOCUMENTS

| | | | | |
|---|---|---|---|---|
| 143,354 A * | 9/1873 | Jones | ............................ | 172/379 |
| 223,892 A * | 1/1880 | Delany | ............................ | 47/32 |
| 311,428 A * | 1/1885 | Hill | ............................ | 172/379 |
| 382,708 A * | 5/1888 | Koontz | ............................ | 43/124 |
| 473,872 A * | 4/1892 | Gillpatrick | ............................ | 43/77 |
| 727,054 A * | 5/1903 | Arndt | ............................ | 43/1 |
| 889,656 A * | 6/1908 | Burckhalter | ............................ | 172/379 |
| 926,275 A * | 6/1909 | Merritt | ............................ | 43/77 |
| 1,020,762 A * | 3/1912 | Judson | ............................ | 172/21 |
| 1,068,400 A * | 7/1913 | Hodge | ............................ | 43/77 |
| 1,172,981 A * | 2/1916 | Gorman | ............................ | 172/379 |
| 1,272,152 A * | 7/1918 | Trager | ............................ | 172/379 |
| 1,276,887 A * | 8/1918 | Eckart | ............................ | 47/32 |
| 1,432,293 A * | 10/1922 | Ingols | ............................ | 473/499 |
| 1,744,022 A * | 1/1930 | Johns | ............................ | 43/124 |
| 1,910,042 A * | 5/1933 | Nyman | ............................ | 172/379 |
| 1,965,177 A * | 7/1934 | Finkl | ............................ | 43/124 |
| 1,996,894 A * | 4/1935 | Alvord | ............................ | 52/101 |
| 2,020,571 A * | 11/1935 | Pick | ............................ | 43/124 |
| 2,079,506 A * | 5/1937 | Jenks | ............................ | 172/379 |
| 2,086,826 A * | 7/1937 | Smith | ............................ | 43/80 |
| 2,122,266 A * | 6/1938 | Seys | ............................ | 473/499 |
| 2,146,264 A * | 2/1939 | McKenzie | ............................ | 172/379 |
| 2,169,557 A * | 8/1939 | Curtiss | ............................ | 172/379 |
| 2,189,428 A * | 2/1940 | Love | ............................ | 473/497 |
| 2,245,692 A * | 6/1941 | Lamb | ............................ | 172/378 |
| 2,263,874 A * | 11/1941 | Hilleman | ............................ | 47/32 |
| 2,306,080 A * | 12/1942 | Peles | ............................ | 52/101 |
| 2,457,454 A * | 12/1948 | Dunlap | ............................ | 473/499 |
| 2,748,557 A * | 6/1956 | Eadie | ............................ | 172/379 |
| 2,787,203 A * | 4/1957 | Smith | ............................ | 172/379 |
| 2,887,730 A * | 5/1959 | Bittner | ............................ | 52/101 |
| 2,899,775 A * | 8/1959 | Partin | ............................ | 47/32 |
| 2,910,127 A * | 10/1959 | Saunders | ............................ | 172/21 |
| 3,282,000 A * | 11/1966 | Shaw et al. | ............................ | 43/77 |

(Continued)

FOREIGN PATENT DOCUMENTS

DE 3336133 A1 * 4/1985
DE 3501333 A1 * 7/1986

(Continued)

*Primary Examiner* — Darren W Ark

(57) ABSTRACT

This invention is directed to a device that blocks a mole tunnel and to a method of halting mole tunneling activity and preventing or interfering with further such activity by blocking the tunnel at point(s) along the tunnel.

18 Claims, 7 Drawing Sheets

U.S. PATENT DOCUMENTS

| | | | |
|---|---|---|---|
| 3,362,115 A * | 1/1968 | Nyhus et al. | 52/101 |
| 3,478,827 A * | 11/1969 | Madison | 172/379 |
| 3,489,411 A * | 1/1970 | Morelli | 473/417 |
| 3,971,558 A * | 7/1976 | Gardetto | 473/499 |
| 4,109,406 A | 8/1978 | Denninger | |
| 4,179,836 A * | 12/1979 | Clark | 43/77 |
| 4,309,031 A * | 1/1982 | O'Meara | 473/415 |
| 4,383,686 A * | 5/1983 | Cardieri | 473/417 |
| 4,404,778 A * | 9/1983 | Ushimaru | 52/101 |
| 4,405,130 A * | 9/1983 | Mullany | 473/499 |
| 4,445,685 A * | 5/1984 | Cardieri | 473/417 |
| 4,494,335 A | 1/1985 | Gaines | |
| 4,596,731 A * | 6/1986 | Cudmore et al. | 47/1.01 R |
| 4,648,203 A * | 3/1987 | Worzek | 47/32 |
| 4,776,128 A | 10/1988 | Townsend | |
| 4,790,102 A | 12/1988 | McPherson | |
| 4,791,995 A * | 12/1988 | Hochlan, Jr. | 172/379 |
| 4,827,662 A | 5/1989 | Dahlman | |
| 4,856,779 A * | 8/1989 | Wallendal | 473/497 |
| 4,967,522 A * | 11/1990 | Keen | 47/32 |
| 5,191,733 A * | 3/1993 | Withrow | 43/79 |
| 5,205,066 A | 4/1993 | Jan | |
| 5,307,587 A | 5/1994 | Zeiger | |
| 5,400,552 A * | 3/1995 | Negre | 52/101 |
| 5,433,029 A * | 7/1995 | Donoho et al. | 43/1 |
| 5,451,239 A * | 9/1995 | Sewell et al. | 47/32 |
| 5,528,855 A * | 6/1996 | Kapphahn | 47/32 |
| 5,528,858 A * | 6/1996 | Omdahl | 47/32 |
| 5,588,252 A * | 12/1996 | Jones | 43/124 |
| 5,596,834 A * | 1/1997 | Ritter | 43/124 |
| 5,597,046 A | 1/1997 | Fisk | |
| 5,615,524 A * | 4/1997 | Costa, Sr. | 52/101 |
| 5,716,295 A * | 2/1998 | Anglea | 473/497 |
| 5,782,041 A * | 7/1998 | Filipescu | 52/101 |
| 5,870,847 A | 2/1999 | Hsiao | |
| 6,000,169 A | 12/1999 | Jan | |
| 6,095,091 A * | 8/2000 | Byrne | 52/101 |
| 6,134,827 A | 10/2000 | Jan | |
| 6,142,241 A * | 11/2000 | Finley | 172/378 |
| 6,157,594 A | 12/2000 | Jan | |
| 6,223,456 B1 * | 5/2001 | Hawkins | 172/22 |
| 6,289,639 B1 * | 9/2001 | Robertson | 52/101 |
| 6,564,881 B2 * | 5/2003 | Murtagh | 172/371 |
| 6,578,314 B1 | 6/2003 | Schmidt | |
| 6,786,842 B1 * | 9/2004 | Nasiatka | 473/499 |
| 6,802,152 B2 | 10/2004 | Hagen | |
| 6,868,633 B2 | 3/2005 | Schroedl | |
| 6,920,938 B1 * | 7/2005 | Rotan et al. | 172/21 |
| 7,088,251 B2 | 8/2006 | Weilbacher | |
| 7,104,005 B2 | 9/2006 | Holtgrefe | |
| 7,171,779 B1 | 2/2007 | Kok | |
| 7,204,053 B1 | 4/2007 | Holtgrefe | |
| 7,935,007 B1 * | 5/2011 | Gawryla | 473/499 |
| 8,167,746 B2 * | 5/2012 | Massaro | 473/497 |
| 2005/0081426 A1 * | 4/2005 | Hsia | 43/124 |
| 2005/0126509 A1 * | 6/2005 | Weiss | 119/712 |
| 2006/0225342 A1 * | 10/2006 | Hamman | 47/1.01 F |
| 2007/0068065 A1 | 3/2007 | Brown | |
| 2007/0119094 A1 | 5/2007 | Ouzts | |
| 2007/0271859 A1 * | 11/2007 | Scheirs | 52/101 |
| 2009/0270206 A1 * | 10/2009 | Massaro | 473/497 |
| 2010/0192483 A1 * | 8/2010 | Nilsson et al. | 52/101 |
| 2010/0210382 A1 * | 8/2010 | Clark | 473/499 |
| 2011/0131866 A1 * | 6/2011 | Everett et al. | 43/79 |
| 2011/0214338 A1 * | 9/2011 | Neumann | 43/77 |

FOREIGN PATENT DOCUMENTS

| | | | |
|---|---|---|---|
| DE | 3524923 A1 * | 10/1986 | |
| DE | 202006011963 | 11/2006 | |
| DE | 102005055527 A1 * | 6/2007 | |
| EP | 230736 A2 * | 8/1987 | |
| EP | 712751 A1 * | 5/1996 | |
| GB | 2249013 A * | 4/1992 | |
| GB | 2303040 A * | 2/1997 | |
| GB | 2359724 A * | 9/2001 | |
| GB | 2380388 A * | 4/2003 | |
| JP | 04190732 A * | 7/1992 | |
| JP | 08228656 A * | 9/1996 | |
| JP | 08280316 A * | 10/1996 | |
| JP | 08298914 A * | 11/1996 | |
| JP | 10004855 A * | 1/1998 | |
| JP | 11196752 A * | 7/1999 | |
| JP | 2000245326 A * | 9/2000 | |
| JP | 2002153196 A * | 5/2002 | |
| JP | 2002291393 A * | 10/2002 | |
| JP | 2003328599 A * | 11/2003 | |
| JP | 2006061078 A * | 3/2006 | |
| JP | 2007082516 A * | 4/2007 | |
| JP | 2007129951 A * | 5/2007 | |
| JP | 2007175041 A * | 7/2007 | |
| JP | 2007295839 A * | 11/2007 | |
| JP | 2009195203 A * | 9/2009 | |
| JP | 2009254314 A * | 11/2009 | |
| JP | 2010051300 A * | 3/2010 | |
| JP | 2010166893 A * | 8/2010 | |
| JP | 2011182735 A * | 9/2011 | |
| WO | WO 00/11945 A1 * | 3/2000 | |

* cited by examiner

METHOD AND DEVICE FOR HALTING MOLE TUNNELING ACTIVITY

CROSS-REFERENCE TO RELATED APPLICATIONS

This application claims priority to U.S. Application No. 61/328,176, filed Apr. 26, 2010, and 61/392,527, filed Oct. 13, 2010. Each application from which priority is claimed is hereby incorporated by reference.

BACKGROUND

Moles have long been an undesirable problem for lawn owners, golf courses, gardeners and others attempting to protect their land from surface damage. A mole's front two claws are powerful and designed for digging tunnels. A mole typically digs in total darkness; its nose aids in the digging process, sensing the location of soil and moving the soil for easier removal. Mole tunnels create an undesirable appearance and contour on grass landscapes. A family of moles can do considerable damage to a lawn by burrowing just under the ground's surface, creating elevations, bumps and unsightly appearance to the property. Typically, tunnels dug by moles cause a 1.5-2.5 inch elevation of ground surface, disrupting the normal contour of the ground surface.

In addition, the burrowing and burrows separate surface plants such as grass from their roots, causing an eventual death of the surface plants and producing unsightly, meandering patterns of dead grass on a grass surface landscape if repair to the landscape is not effected quickly. Moles use the tunnels as a food source, devouring worms, bugs, beetles, insects roots and such; their continued activity in the area furthers damage to surface plants and causes additional expense to repair.

Moles are difficult to control. Many solutions have been attempted, with only mixed results: electronic devices, poisons, traps with knives to kill moles in their tunnels, pouring bleach solution into mole tunnels, using water hoses to flood tunnels and drown moles inside, attaching hoses to the exhausts of internal combustion engines are among the methods used to control the moles. Poisons, traps and other hazardous substances may be found by pets or small children, and potentially cause great harm to them.

There is a need for a device that will halt moles' tunneling activity and prevent or interfere with further burrowing activity in an area, without presenting highly dangerous materials to a lawn.

SUMMARY OF INVENTION

The present invention is directed to a device and to a method to halt moles' tunneling activity and prevent or interfere with further burrowing activity. The device halts the further extension of mole tunnels, blocks reuse of the tunnels for instance after landscape repairs have been made, and allows for the immediate repair of the disturbed ground to facilitate saving of grass and other surface plants endangered by a mole tunnel. When in use, the device physically blocks tunnels created by one or more moles. The device also discourages attempts by a mole to remove the device, and has spiked projection(s) on a first facing surface and most preferably on both the first facing surface and second facing surface of the device. (For the purposes of this invention, a device has a body having 2 facing surfaces—one surface facing in each direction into the lumen of a tunnel once the device has been inserted into and cross-wise blocks the tunnel. See for instance FIG. 6C). The type of spiked projection can be varied. The goal is to present an uncomfortable surface on the device, so that any attempts by a mole to push against, dig up or otherwise remove the device will result in sharp discomfort to either paws or nose, both of which are used for digging. This will hinder or halt efforts to remove the device. By preventing moles from using their tunnels for food-gathering purposes and by blocking the entrance to their dens, the moles are forced to leave and burrow elsewhere, or die.

A method of halting mole tunneling activity according to the present invention comprises the steps of identifying a mole tunnel, and blocking the tunnel preferably by positioning and inserting the device into the ground and tunnel. Preferably, both facing surfaces have spiked projection(s) that in use project into the tunnel in both directions. When inserting the device, a penetrating end (preferably pointed) of the device passes through the bottom of the tunnel, so that the body of the device faces into and blocks the tunnel. When in use, the device (alone or in combination with other devices) halts all further use of the tunnel by the moles, forcing them to abandon their burrow. The tunnels may be flattened to their original configuration, preferably prior to inserting the devices. With sufficient watering, the surface plants may be saved. This will save considerable work and time to restore the ground surface to its original condition.

The method preferably further comprises placement of more than one device into a tunnel or series of tunnels. Strategic placement of more than one device according to the present method may be achieved as follows: when unwelcome mole tunnels are observed in an area, a person may follow a mole tunnel to its end. Using his foot, the person may gently but firmly press the soil down, back to its original position prior to the mole's intrusion. This is best done by pressing downward with one's foot perpendicular or cross wise to the direction of the tunnel. Stomping is not recommended as it could cause further damage to the ground surface grass and underlying roots. In addition, stomping could cause a more uneven ground surface. The gentle downward pressure compresses the dirt enabling the grass and underlying roots to more easily re-establish their previous connections and, in addition, creates a firmer supporting base for this device.

Next, the device is positioned and inserted into and through the mole tunnel by pounding the device downward, preferably perpendicularly (crosswise) to the tunnel, with the spiked projections preferably facing up and down (into and out of) the tunnel. The penetrating end (preferably a triangular base point) is driven downward into the floor of the tunnel unit. The top surface (pounding surface) of the device is preferably flat and is preferably positioned just under the ground surface. The top surface may be concave or convex, and may include a removable or fixed handle, for instance for easy carrying of a device of this invention or to facilitate insertion into the ground and mole tunnel. The device, with its spiked projections and being firmly embedded in the compressed earth and the floor of the tunnel, creates a solid resistance block prohibiting any further extension of the tunnel. In addition, the spiked projections of the device prevent the mole from further forward progression in that area by creating discomfort to the nose and claws of the animal if it attempts to remove or move the device.

After blocking the far end of the tunnel, follow the tunnel back to where it originates from another tunnel. Pound another device at the entrance of the tunnel following the same procedure. The device will block the mole from re-entering the tunnel and causing additional or repeat damage. Repair of the damaged grass and ground surface can begin immediately as the mole is effectively blocked from re-entering the tunnel. This also interferes with the food supply for the moles.

This procedure can be followed wherever the mole tunnels are found. One or more devices can be hammered into any long tunnel, for instance every 8 to 10 feet, to hinder further food gathering activity and discourage creating a new entry into the tunnels.

During mole activity, an underground burrow or den may be made by the moles. This is their home base. The den can usually be identified by a mound of dirt on the ground surface. In a further preferred embodiment of this method, carefully remove the mound of dirt and locate the tunnel or hole leading down into the burrow. Pound a device into the tunnels as well as the den entrance. Drive in the device at an angle if necessary to cover as much of the den entrance hole as possible. Cover the device with dirt and gently but firmly pack dirt over it to stop the moles from using the den. By blocking off the tunnels and sealing off the dens the moles will have no choice but to leave the den, or starve.

Without being bound by theory, it is believed the present device hinders mole activity by mimicking the incidence of rock formations in the earth, which are naturally detrimental to mole activity.

Preferably, the device is made of biodegradable plastic or another hard, biodegradable material, and will gradually dissolve, deteriorate or weaken. In the alternative, the device (particularly the body and penetrating end) may be made of a water resistant material, or coated with a water-resistant solution, to improve appearance and longevity in the ground if desired. Other materials that may be used to make a device of the present invention include wood, iron or other hard metals or their alloys. The device according to the present invention may comprise a combination of spiked projections and/or a composite formation on the facing surface(s) of the device, to simulate natural rock formations.

Other embodiments of the present invention include any device or object or group of objects that will block mole tunnels so moles cannot move from place to place in their burrow. The present invention may include any device that will cause blockage of a mole tunnel in such a manner as to prevent moles from moving past the device. The device also includes a mechanism for discouraging the mole from attempting to move or remove the device; preferably, the mechanism comprises one or more spiked projections, however, other tactile or other sensory-based deterrents may be used, alone or in conjunction with the spiked projections, including for instance chemical substances having a repellant smell, devices delivering an electric shock or piercing noise, and so forth. The use of a liquid, gel, semi-liquid or other substance that can be introduced into the tunnel and harden therein may also serve as a device of this invention.

The device can be used on other groups of living animals e.g. gophers, snakes etc. The size of the device can vary depending on the size of the animal being dealt with. Its thickness and size can be adjusted according to the nature of animal being dealt with. Devices of the present invention may also be used to assist in controlling the movements of larger animals as well, such as animals in the large cat family moving through tunnels, by sizing the device appropriately to the tunnel size.

The present invention further comprises a device comprising means for blocking a mole tunnel, and means for discouraging a mole from removing the device, for instance as discussed above. Embodiments of the device and various elements of the present invention disclosed throughout this application and its claims are intended as illustrative and not limiting.

DETAILED DESCRIPTION OF INVENTION

Figure 1:
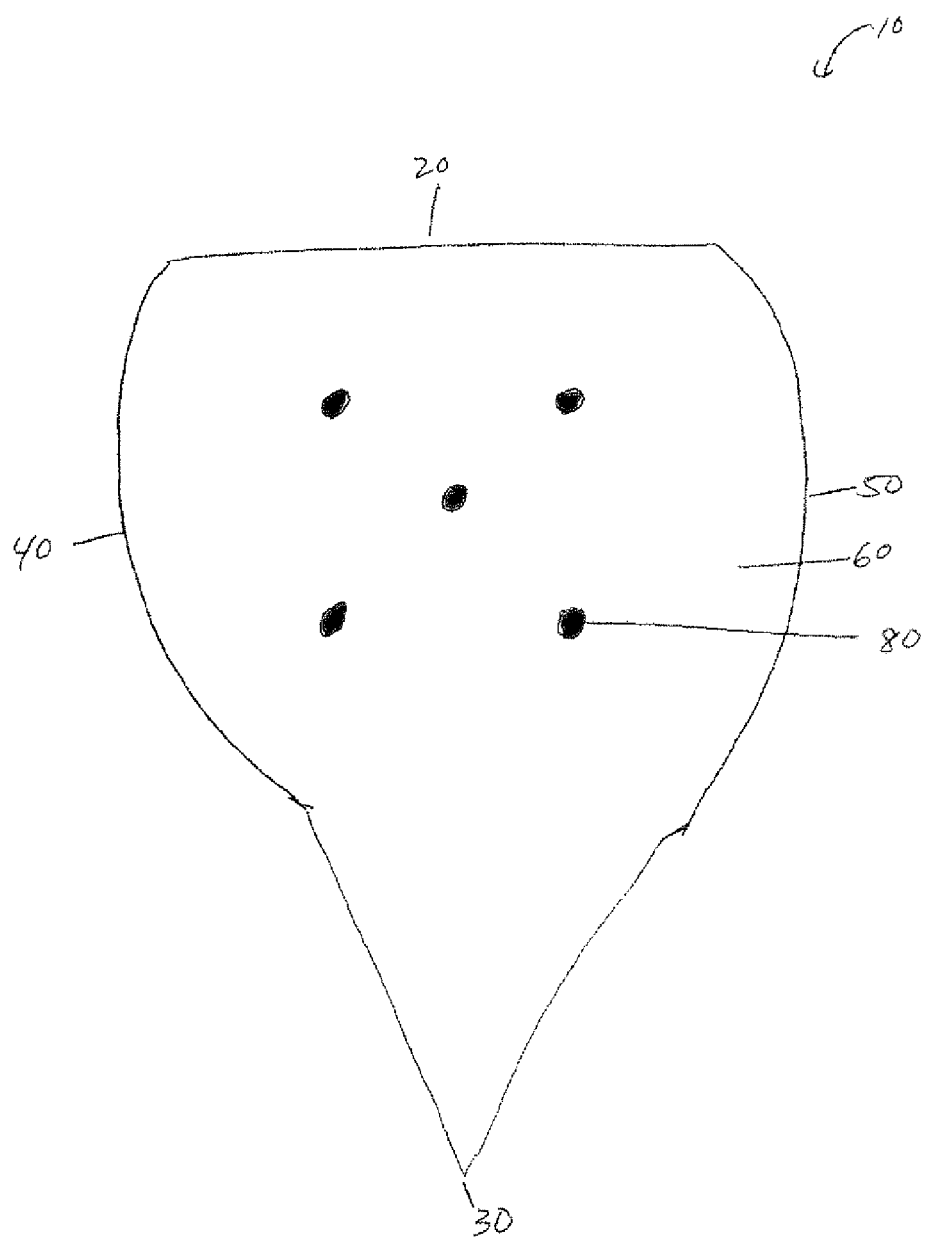
FIG. 1 shows a front view of a device of the present invention.

The present invention is directed to a device comprising a body with spiked projections and a penetrating end, as described herein and shown for example in FIGS. 1, 2A, 2B, 3A, 3B, 3C, 3D, 4A, 48, 4C, 5A and 5B. The penetrating end (30) includes the bottom surface of the device shown in these Figures, and shown in FIG. 6C as the part of the device pressed through soil and mole tunnel and then imbedded in the soil below the mole tunnel. Reference numbers 20 and 40-70 refer to some parts of the body of the device, and reference number 80 refers to spiked projections supported by the device. Overall, the body of the device is intended in use to physically block a mole tunnel and includes spiked projection(s) to deter a mole from removing the device. The penetrating end is intended in use to penetrate soil above a mole tunnel, the tunnel itself and soil beneath a mole tunnel. These elements of a device of the present invention are named for convenience and not meant to be limiting as named— portions of the body of the device may facilitate penetration, and portions of the penetrating end may end up partly blocking a mole tunnel.

The penetrating end (30) of a device (10) of the present invention enables the device (10) to be driven into the ground, through the ground surface, mole tunnel and the bottom of the tunnel into the soil below; the penetrating end also preferably helps anchor the device in the soil, once inserted. The device is driven into the ground preferably by pressing or pounding on the top surface (20), also called the pounding surface. (See FIG. 6C for a representation of a device of the present invention inserted into the ground and blocking a mole tunnel). The body of the device is designed and sized to block a mole tunnel and deter a mole from moving through the tunnel, and includes spiked projections to prevent a mole from digging around or otherwise removing the body of the device (10). The body is preferably at its widest point about 1.75 to about 5 inches wide and about 1.75 to about 5 inches high, with at least 1 spiked projection projecting out of a first facing surface, and preferably more than 1 spiked projection projecting out of both facing surfaces as discussed for instance below. Preferably, the body is ⅛-¾ inches thick, more preferably ¼ to ½ inch thick, and may be ⅛", ⅙ inch, ¼ inch, ⅜ inch, ½ inch, ⅝ inch or ¾ inch.

Figure 2A:
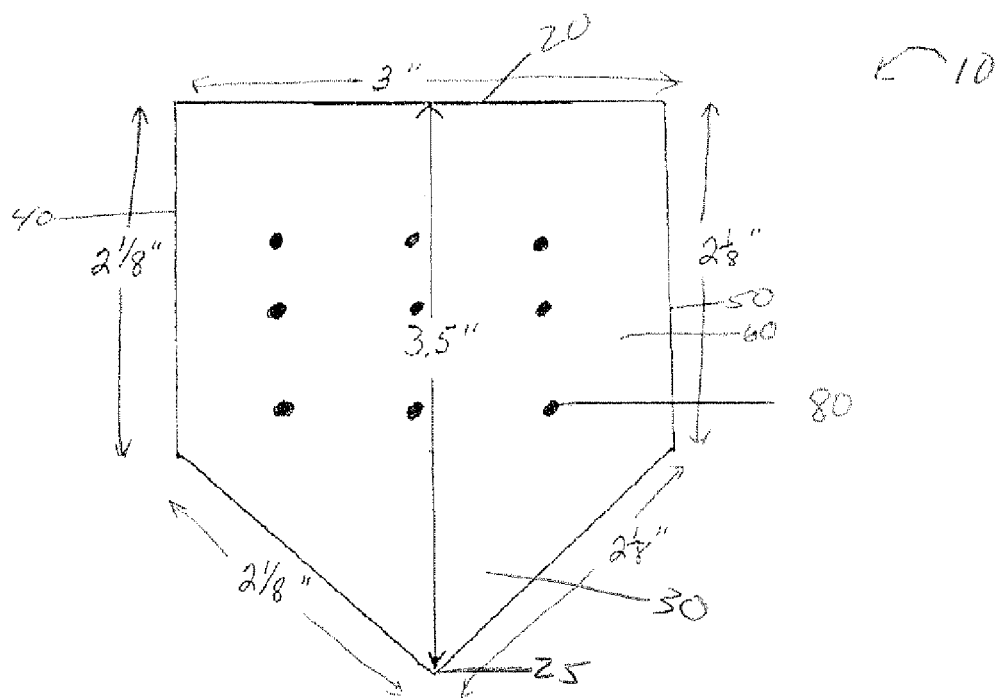
FIG. 2A shows a front view of a device of the present invention.
Figure 2B:
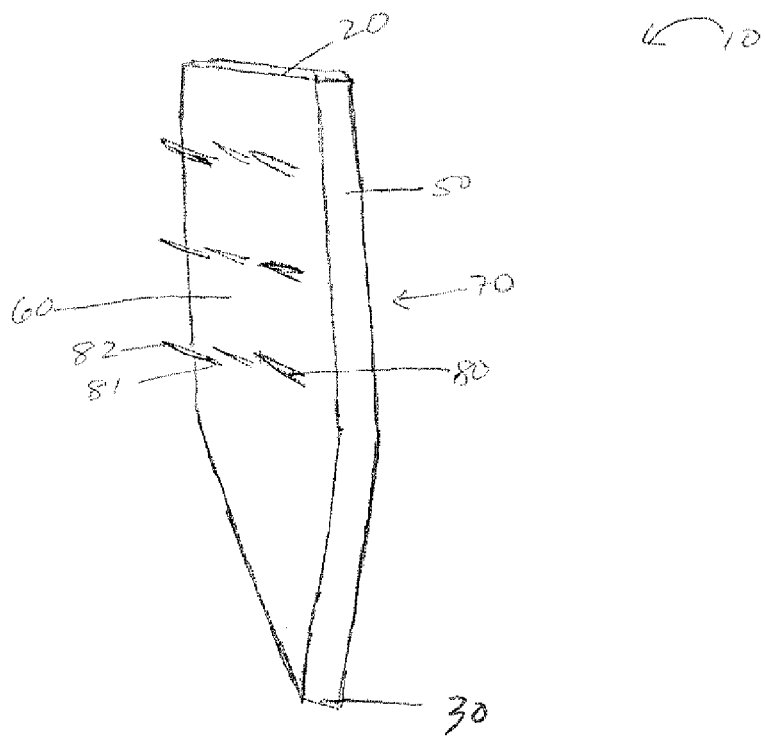
FIG. 2B shows a perspective side view of the device illustrated in FIG. 2A.
Figure 3A:
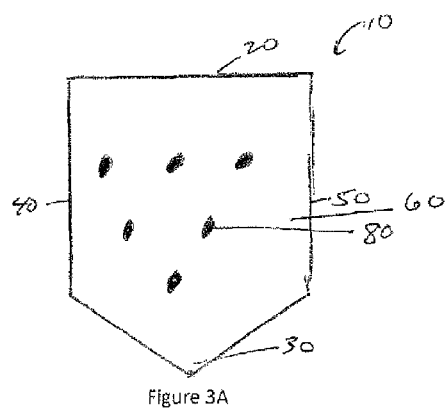
FIG. 3A shows a front view of a device of the present invention.
Figure 3B:
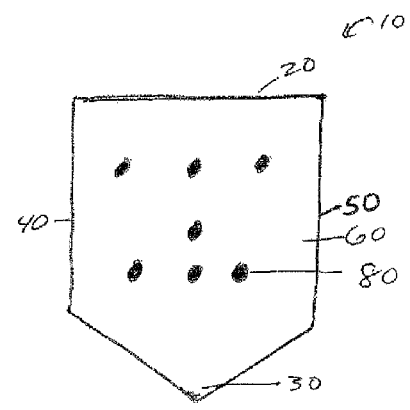
FIG. 3B shows a front view of a device of the present invention.
Figure 3C:
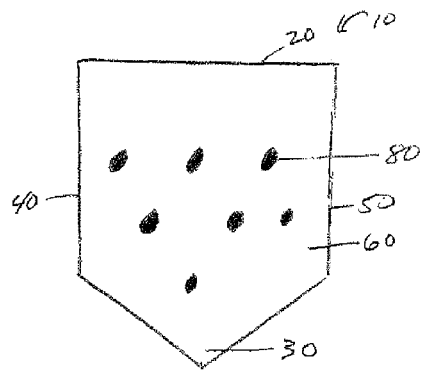
FIG. 3C shows a front view of a device of the present invention.
Figure 3D:
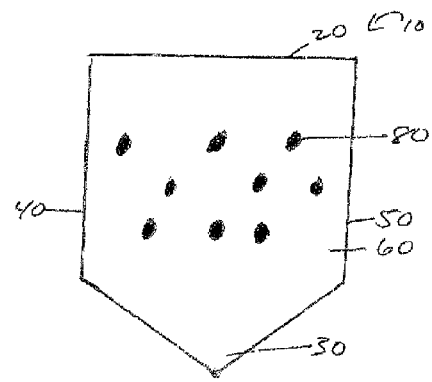
FIG. 3D shows a front view of a device of the present invention.

FIG. 1 shows a device (10) of the present invention with a body having a flat pounding surface (20), rounded side surfaces (visualized only as a curved line in this Figure; 40, 50), a penetrating end (30) contiguous with the body of the device and 5 spiked projections (80) on a first facing surface (60). The spiked projections are represented as filled circles, as the projections project preferably perpendicularly away from the facing surface. FIGS. 2A and 28 show a preferred embodiment including dimensions and placement of body (the thickness of the device shown in FIG. 2B is ¼ inch, as mentioned in Example 2), contiguous penetrating end and 9 spiked projections (80) on a first facing surface (60). Preferably, at least 5 spiked projections (more preferably 5 to 30 spiked projections, or 6 to 16 spiked projections, or other numbers as indicated below) are present on each facing surface of a device of the present invention. The dimensions of the device may vary with the size or other characteristics of the tunnel to be blocked and/or the animal to be deterred from tunneling in the ground.

FIG. 2A shows another embodiment of the present invention, having a body about 3 inches wide at the top "pounding" surface (20) and about 2⅛ inches high at the side surfaces (40, 50), along with a bottom surface and penetrating end (30). FIG. 2A also shows a height of the device (10) at about 3.5 inches, from the top surface (20) to the farthest point of the penetrating end (30). FIG. 28 represents the same device as shown in FIG. 2A, but from a side perspective view, to show in part spiked projections projecting away from, or out of, a facing surface of the device, so in use they will project into a mole tunnel. FIG. 1 shows a device (10) of the present invention with a different body shape but a similar penetrating end shape to that shown in FIGS. 2A and 2B. Example 2 below discloses results of devices made in keeping with the dimensions of FIG. 2 in halting mole activity in tunnels blocked with the devices.

As indicated in Example 1 below, a device without spiked projections may be removed by a determined mole. While anchoring systems or other deterrents to removing a tunnel block may be considered to overcome this problem, the present invention is preferably directed to spiked projections to prevent removal of the device. The spiked projections may vary in size, shape, and spacing in the present invention. FIG. 2B shows 9 spiked projections (80) arranged in 3 rows of 3 spiked projections, with the spiked projections projecting from the first facing surface (60), with a base portion (81) nearest the facing surface, and with each spike portion (80) projecting away from the first facing surface toward a spike portion (82). Preferably, a spiked projection of the present invention projects away from a facing surface or other portion of the device at an angle of about 45 to about 135 degrees, more preferably about 70 to about 110 degrees; more preferably at an angle of about 80 to about 100 degrees, and most preferably at an angle of about 85 to 95 degrees from the facing surface (first and second) of the device. The spiked projection may be angled so that in use the spiked projections project slightly up and away from the penetrating end or down and toward the penetrating end, and/or left or right toward a side of the device (40, 50), or a combination of up and to a side, or down and to a side. The spiked projection may project from the first facing surface at an angle of about 90 degrees from the first facing surface. Spiked projections according to the present invention are preferably immovably fixed on the device. In a preferred embodiment of the present invention, the second facing surface (70) also comprises spiked projection(s) in keeping with this invention. While the device (10) of FIG. 2B shows 9 spiked projections, the device (10) of FIG. 1 shows 5 spiked projections, illustrating that the number of spiked projections necessary for the present invention to work may vary to some extent. In the embodiment shown in FIG. 2B, the spiked projections (80) are about ⅜ inches long (distance between first facing surface and pointed tip of spike), extending approximately perpendicularly from the first facing surface (60) of the device (10). Spiked projections according to the present invention are preferably about ⅛" to about 1" long, more preferably about ¼ inch to about ¾ inches long, and most preferably ⅜ to ½ inches long. An individual spiked projection of the present invention may be for instance ⅛, ¼, ⅜, ½, ⅝, ¾, ⅞ or 1 inch long, or otherwise sized as appropriate for the size of the device and the size of the animal to be deterred from tunneling. The spiked projections should be long enough and sharp enough to deter a mole from removing a device of the present invention from a mole tunnel, and short enough to make them easy to handle, manufacture and package. Spiked projections may be directly affixed to a facing surface, for instance at the base of the projection (81), but are preferably pressed through the body of the device (10) for instance as shown with staples in FIGS. 5A and 5B. Spikes/spiked projections may be spaced in a regular pattern for instance as illustrated in FIGS. 1 and 2A or more randomly spaced. Preferably spiked projections of the present invention are spaced about ¼ to about 2 inches apart, more preferably about ½ to 1.5 inches apart, even more preferably about ¾ to about 1.25 inches apart, and most preferably about ¾ to about 1 inch apart. The distance between any two given spiked projections need not be the same as the distance between two other spiked projections. Spacing should not be too close together, as spiked projections too near each other may present a relatively blunt surface, depending in part on the sharpness of the spike. Also, spacing spiked projections too far apart may allow the mole too much access to the body or penetrating end of the device, allowing disruption or removal of the device. Spiked projections may be included in the penetrating end (30) of the present invention as well, although not pictured herein. Spiked projections on the penetrating end of the present invention may be angled upward to deter removal by a digging animal.

A spiked projection may also further be coated with or able to administer a chemical substance such as a drug or poison to a mole approaching the device, or to transmit for instance an electric shock to the animal. Similarly, a device of the present invention may be equipped to deliver such chemicals or electric shock to a mole. Also, a device of the present invention may be coated, impregnated, or otherwise treated with or carry a substance comprising a smell offensive and repellant to a mole, or other mechanism to repel the mole and discourage attempts at removing a device of the present invention.

Figure 4A:
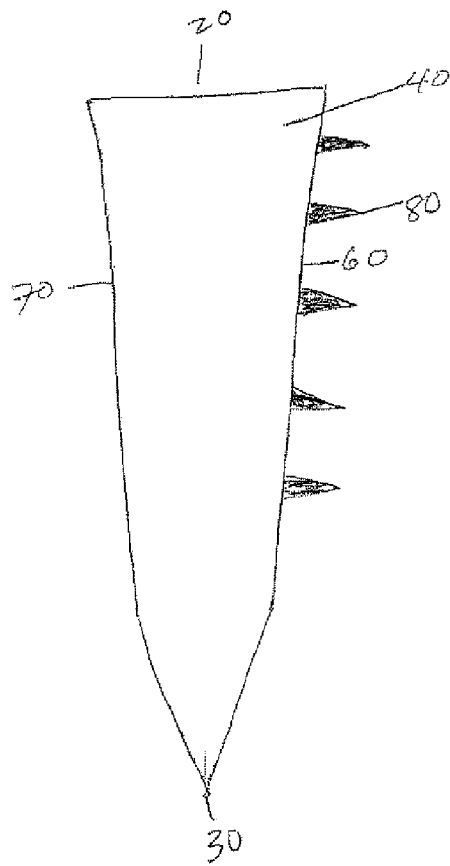
FIG. 4A shows a side view of a device of the present invention.
Figure 4B:
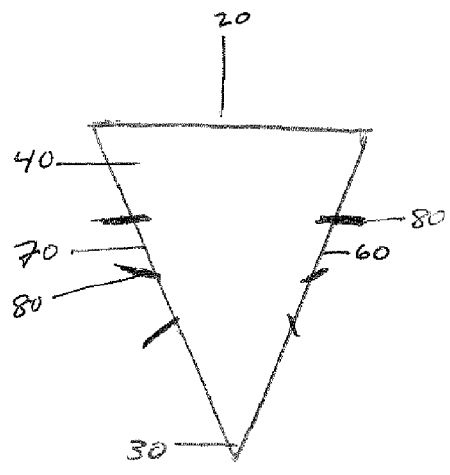
FIG. 4B shows a side view of a device of the present invention.
Figure 4C:
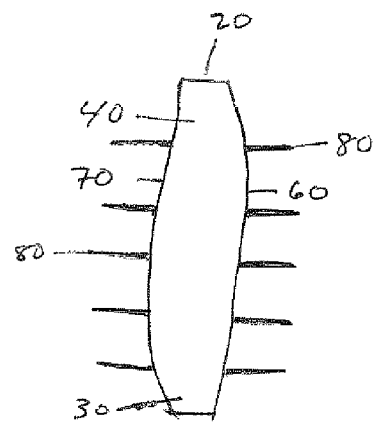
FIG. 4C shows a side view of a device of the present invention.
Figure 5A:
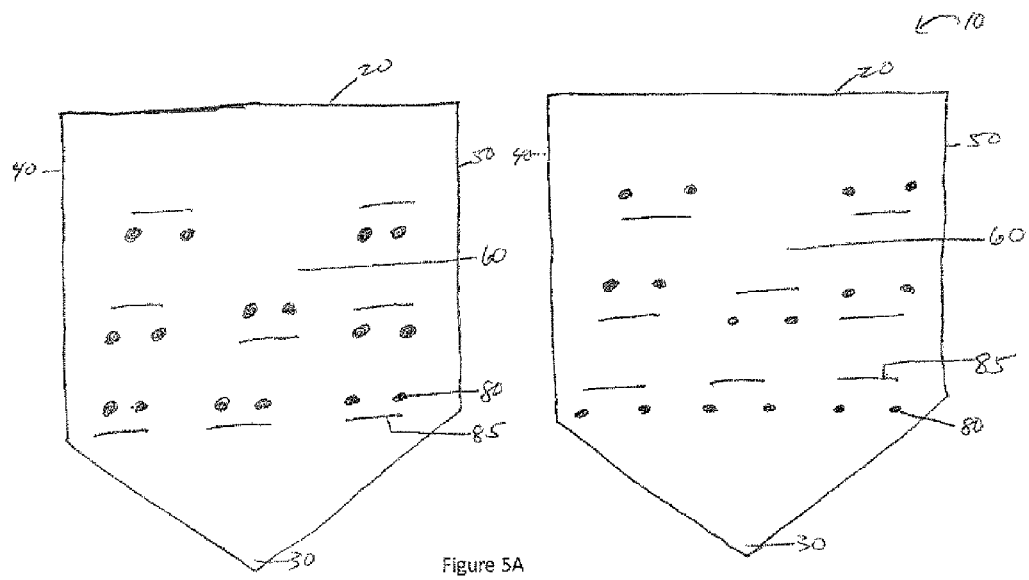
FIG. 5A shows a front and back view of a device of the present invention.
Figure 5B:
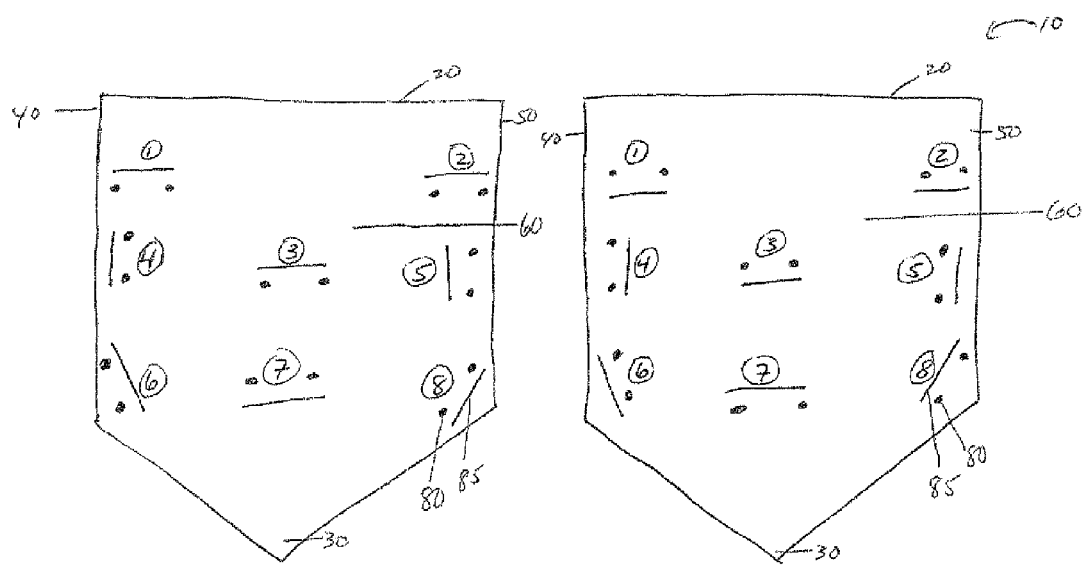
FIG. 5B shows a front and back view of a device of the present invention.

FIGS. 3A, 3B, 3C and 3D show facing surfaces of the present invention with spiked projections projecting out of and away from the facing surface in varying numbers and configurations. FIGS. 4A, 4B and 4C represent side views of devices of the present invention to show exemplary variations such as (4A, B) to facilitate insertion of a device into the soil, and convex facing surfaces (FIG. 4C; 60, 70). FIGS. 5A and 5B illustrate both facing surfaces of two embodiments of the present invention; the embodiment disclosed in FIG. 5B corresponds to the devices described in Example 3 below. Horizontal lines represent staple heads (85); filled circles organized in pairs represent the 2 pointed spikes associated with a staple head (85) on the opposing facing surface. Staple heads (85) represented on one facing surface correspond to staple spikes (80) on the opposing facing surface in FIG. 5A and independently in FIG. 5B. Similarly, spiked projections (80) in one facing surface represented in FIG. 5A correspond to staple heads (85) in the other facing surface represented in FIG. 5A; likewise, FIG. 5B.

The configuration of spiked projections in FIG. 5B represents a preferred embodiment of the present invention, and the embodiment described in Example 3 below. The configuration is designed to hinder removal of a device (10) of the invention by a mole by taking into consideration that to remove the device, the mole may maneuver its paws around the edges of the lower ½ of the device. In FIG. 5B, staples 4, 5, 6 and 8 (see numbers in circles) are placed near the outside edge of the device to make it difficult for the mole to secure a sufficient grasp on the device without experiencing discomfort from a staple point. Staples across the bottom (position 7) may be the first contact points on the device the mole would touch; especially, contact for his paws. Spiked projections are included there to discourage the mole from further digging or removal attempts from that area. The staple in the center (staple 3) may be the first contact of the device with the mole's nose. The nose is important to a mole's digging ability and is an added discomfort point to further discourage the mole from attempting to remove the device. The staples across the top, 1 and 2, are also further discomfort points to overwhelm and discourage the mole from removing the device. The top is less important in this embodiment as the mole would have more difficulty removing the device due to lack of leverage at the top. The top row of staples may alternatively be moved downward some to allow extra room toward the top of the device, for instance for easier handling and holding while positioning and inserting into the ground.

A device of the present invention may be stake-like in that it includes a penetrating end (which may be shaped like a typical stake and attached to the body) and in use is to be driven into the ground. The term "a penetrating end" herein means an end of the device that is to be driven through the surface of the ground, the lumen of the mole tunnel and the bottom of the mole tunnel, to help position the body of the device so that the device blocks a mole tunnel and presents sharp spiked projections into the tunnel. The penetrating end may be shaped into a point, for instance like a typical stake, to facilitate driving of the device into the ground. Preferably, the penetrating end is contiguous with (seamlessly connected to) the body of the device of this invention and has one pointed end, as pictured for instance in all of the Figures. However for instance, the penetrating end may have more than one point, including for instance a serrated edge or structures, may be blunt or even rounded, or may have a different structure than the body of the device such as the blade of a tent stake, so long as the penetrating end allows and preferably facilitates insertion of the device into the ground. A penetrating end of the present invention is sized as appropriate to allow insertion of the device and preferably aid in anchoring the device in the ground once inserted. Preferably, a penetrating end is sized as indicated in the Figures. Also preferably, a penetrating end attached to a device with a body about 1.75-5 inches wide and high is about 1-4 inches high (portion projecting into the earth below the mole tunnel) and 0.01 to 5 inches wide (where 0.01 inches would represent a finely pointed end). If a penetrating end having the form of a tent stake is attached for instance to a 3 inch wide and 2 inch high body of a device of the present invention, the stake-like penetrating end is preferably about ¹⁄₁₀-½ the width of the device (about 0.3 inches to about 1.5 inches) and about ½ to about 3 times the height of the device (about 1-6 inches). The thickness of a penetrating end may be about the same as the thickness of the body, and preferably narrower (for instance tapering to ½-⅛ the thickness of the device body), while the diameter of the stake-like tent blade is preferably about the same diameter as the thickness of the device, and preferably has a diameter of about ¼ to about 2 time the thickness of the body of the device.

The penetrating end is preferably irreversibly attached to the body. The device (penetrating end, body and spiked projection(s)) may be made by conventional manufacturing methods from plastic, wood, metal, particle board, or any other substance hard enough to maintain the shape of the device and presentation of the spiked projections. The device (penetrating end, body and spiked projection(s)) should be rigid, so that it does not crumple, tear or collapse when inserted into the ground and tunnel or when pressed upon by a mole. Preferably, the entire device is made of biodegradable plastic, so that the device may be left in the mole tunnel to degrade. The device may be made of a soft enough material so that, once mole activity has halted and moles have abandoned the burrow, the device may collapse and disintegrate into the earth. The penetrating end, body and spiked projections may be made of materials different from the other portions of the device, as well. Spiked projections in particular may be made of nails, tacks, staple points, or other metal-based compositions.

Preferably, a device of the present invention (particularly the body and penetrating end) are made of a material that will soften from weather elements. For instance, a material softer than tempered particle board may be used to prepare the body and penetrating end. The device will eventually soften and collapse on the mole tunnel floor. Preferably a device of the present invention is not sufficiently firm to work up from the ground, particularly once softened, so the nails or other material used to make spiked projections of the invention will end up on the tunnel floor under 3-4 inches of dirt. This provides a safety feature for the use of the present devices, helping prevent their discovery by and potential harm to, for instance, children or family pets.

The body of the device is meant, in use, to block the tunnel of a mole or other burrowing rodent so that the mole cannot pass through the tunnel. The body has two facing surfaces (designated first and second for convenience) on opposing sides of the body, with each facing surface dimensioned so as to, when inserted into a mole or other animal tunnel, face the lumen of the tunnel and block the tunnel. For the purposes of the present invention, at least 1 facing surface must have at least 1 spiked projection. If only 1 facing surface of a device of the present invention has spiked projection(s), the facing surface with the spiked projections is the "first facing surface". If both facing surfaces have spiked projections, the first and second facing surfaces of a device of the present invention are interchangeable for the purposes of this invention. The first facing surface is defined as having one or more spiked projections, and is not defined in terms of orientation during use. Preferably, a first facing surface of the present invention comprises 1-200 spiked projections, more preferably 3 to 50 spiked projections, and most preferably 5-20 spiked projections. Preferably, each facing surface is equipped with 5 to 16 spiked projections, for instance as pictured in the Figures. Preferably, as discussed elsewhere herein, in use the first facing surface is positioned to face away from the nearest tunnel opening to the surface and away from the interior of the tunnel. However, the first facing surface may be positioned to face toward the nearest tunnel opening to the surface.

A spiked projection according to the present invention may be made of the same material as the body or a different material, and may be hollow or solid so long as the spiked projections are rigid enough to maintain their pointed shape and deter moles from removing the device in use. The entire device may be made of one material. The spiked projections may be retractable, for instance so that the device is first inserted into the ground with retracted projections, and then the spiked projections unretracted so they project out from the surface of the device. As a safety feature, the spiked projections may also retract when the device is not in use, lying horizontally on the ground, or confronted with force greater than a mole may exert equivalent, for example, to that exerted by a human foot if walking on the device. The size of the spiked projections may vary with the type of soil; sandy and dry soils, for instance, may require a longer and more pointed spike.

Figure 6A:
FIG. 6A shows a perspective side view of a mole tunnel under the ground surface of a lawn.
Figure 6B:
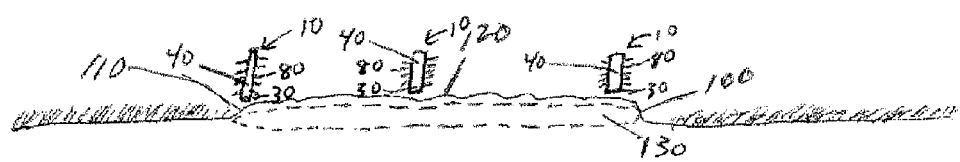
FIG. 6B shows a perspective side view of devices of the present invention positioned for insertion into a mole tunnel.
Figure 6C:
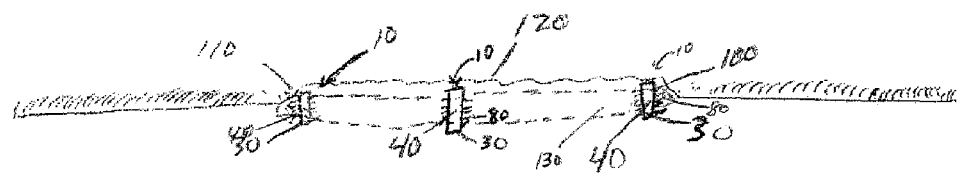
FIG. 6C shows a perspective side view of devices of the present invention inserted into a mole tunnel.

The method of the present invention comprises the steps of identifying a mole tunnel, positioning the device so that when inserted each face with spiked projections will face into the tunnel, and inserting the device into the tunnel. The step of identifying a mole tunnel may include finding a raised tunnel or burrow entry, for instance as shown in FIG. 6A. A raised, relatively grassless area of soil (120) associated with a mole tunnel (130) with 2 tunnel entries from the surface of the ground (100, 110) and the tunnel outlined in a broken line to indicate its presence under the surface of the ground is pictured in FIG. 6A. The step of positioning a device (10) of this invention so that when inserted the pounding surface (20) may be pounded on and the penetrating end (30) enters the soil first and a facing surface with spiked projections (80) will face into the tunnel (120) is shown for instance in FIG. 6B. Devices of the present invention as shown include spiked projections (80) on both facing surfaces of the device (10). The step of inserting the device (10) into the tunnel (120) near a tunnel opening (110) is shown for instance in FIG. 6C. FIGS. 6B and C also show the positioning and inserting of additional devices of the prior invention at other parts of the mole tunnel. Preferably, the device is inserted so that the penetrating end passes through the tunnel and the tunnel floor and is embedded in the soil below the tunnel floor. Preferably prior to insertion the ground surface is compressed to fill the tunnel with soil and stabilize placement of the device. The body of the device blocks the tunnel so a mole cannot pass, and the spiked projections prevent removal of the device. Once inserted into the ground, the top surface (20) of the device (10) is preferably below the surface of the ground, preferably about 0.5 inches to about 1.5 inches below, even more preferably about 1 inch below. Where the tunnel has been compressed to approximate grass and soil configurations prior to making of the mole tunnel, the pounding surface (20) is preferably below the surface of the compressed grass and soil, but still placed to block the tunnel.

The method of the present invention preferably further comprises strategic placement of more than one device into a mole burrow, tunnel or series of tunnels. In a preferred embodiment, a device is positioned at the end of a mole tunnel to prevent moles from increasing the length of the tunnel. Soil is preferably packed against the first and second facing surfaces of each device inserted into the mole tunnel, to provide added support to the device. In a further embodiment, after positioning and inserting a device at the end of a tunnel, one may progress from the end of the tunnel and identify an offshoot tunnel, and position and insert a device at the mouth of the offshoot tunnel. Still more preferably, other offshoot tunnels are identified, and a device positioned and inserted at each identified tunnel mouth to prevent a mole from entering the tunnel and further digging there or accessing a food supply, and/or a device inserted at each tunnel end to prevent further elongation of the tunnel.

Preferably when positioning and inserting a device of the present invention, in this or any other embodiment, a device having a first facing and second facing surface with spiked projections on each surface is used. Also preferably, devices with spiked projections on both sides are inserted along mole tunnels at intervals of every 4 to 12 feet, preferably every 6 to 8 feet, as well at the ends of the tunnels. This embodiment of the method of the present invention effectively transforms a mole tunnel into a series of traps or prisons from which a mole will attempt to escape. The mole's escape reveals their location and allows for better control and use of the present method.

Figure 7:
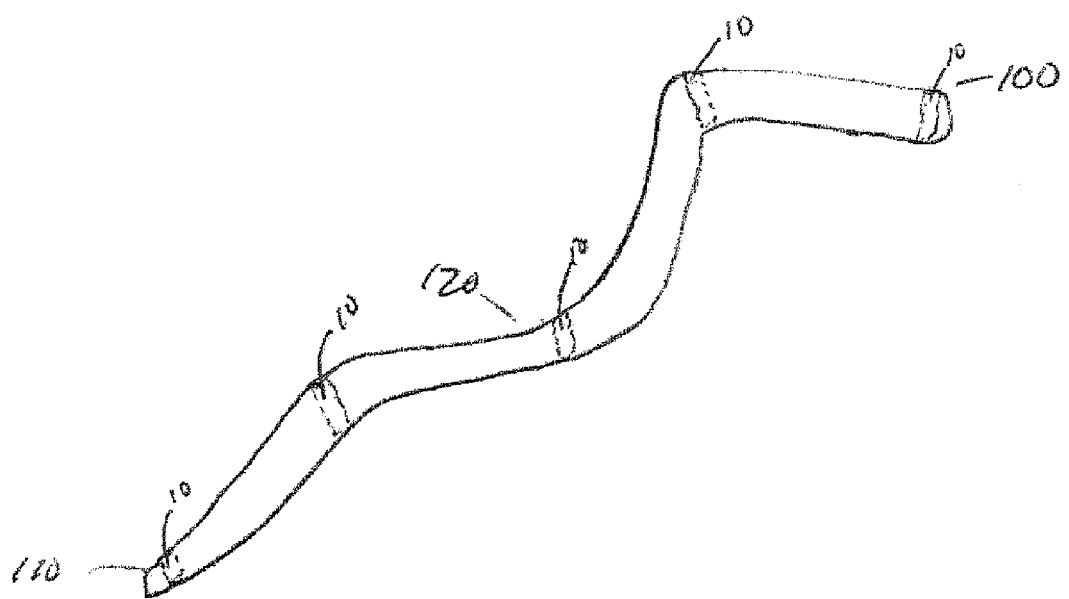
FIG. 7 shows a plan view of a mole tunnel system, with strategic placement of devices of the present invention.

FIG. 7 shows a plan view of 5 devices (10) of the present invention inserted along 1 mole tunnel as seen from the surface (120). Two devices are inserted at the two ends of the tunnel, and three devices inserted at regular intervals (preferably equivalent to 6-8 feet) between the ends of the tunnel. More than 5 devices may be needed to perform the method of the present invention. As indicated in Example 2 below, in 3 separate instances, mole activity was halted after the insertion of 10-20 devices in a given area of active mole tunneling activity, over a period of about 4 days.

In another embodiment of the method of the present invention, the method comprises identifying a mole tunnel, removing the soil atop the tunnel to uncover the tunnel, positioning and inserting one or more devices as discussed above, and then packing soil over the devices to make them more secure and difficult to move.

Without being bound by theory, it is believed that the mole, finding his tunnel blocked and unable to dig around or remove the blockage, digs out through the top of the tunnel and abandons the tunnel and burrow.

One of the main problems in mole control is to discover the active location of the mole or moles. To the untrained eye, as many homeowners or landowners may be, it can be difficult to determine where the mole is. If the landowner sets traps or use poison peanuts, he must wait for the animal to come across his trap or discover the peanuts. If the landowner guesses wrong and the tunnel has been abandoned, the landowner can work in the area for weeks and never catch a mole. The method and device of the present invention allow for the inspection of a wide area of mole activity and allows the user to quickly locate a mole by its fresh activity as it is forced to search for food. The user can then use devices of the present invention to eliminate the animal's presence in 3-5 days, in contrast to the person with traps, who must wait for the mole to run into the trap, if ever. A device of the present invention may further comprise a handle and/or flag attached to the top surface of the device, removably or permanently, to aid in the carrying of the device and the identification of mole burrows where devices have already been inserted into a mole tunnel. A small metallic component may be added to allow for detection of the buried devices by metal detector.

In another method of the present invention, an area of suspicious activity may be identified and the devices inserted into the ground in the area, preferably 5 to 15, more preferably 6 to 8 feet apart. The approach to sealing off a den can also be modified for easier insertion. After a mole den has been found, device(s) may inserted into tunnel(s) going into the den, effectively blocking the mole from entering and exiting the den.

The present invention is directed to a new device and method to effectively control the ground and landscape damage caused by moles by encouraging a mole to abandon its tunnel. The device physically blocks the mole tunnel and, with sharp spiked projections, prohibits any further use by the moles. This device has been shown to immediately stop mole activity within a short period of time when properly installed in mole work tunnels and dens. The present device permits the immediate repair of damage to the landscape from mole activity. The device seeks to be humane, and does not require poisons or knife traps, and poses relatively little to no danger to children or pets while controlling mole activity. The device is simple, direct and easily understood permitting easy and quick installation of the device. The present invention, which includes sharp spiked projections projecting from the first facing and second facing surfaces, stops the moles from removing the device. The present device can be used to seal off the dens of the moles thus interfering with living arrangements and aiding in leading to their disappearance. The use of a physical device, especially adapted to halt the surface landscape damage or lower soil disruption by burrowing animals including moles as well as other burrowing and digging creatures.

The present invention can also be used to seal off the dens or burrows of moles to interfere with their normal living activities. The present invention blocks their food gathering activities and social arrangements. By continually interfering with their food gathering and sealing off their "homes", the moles will move to avoid dying of starvation.

Moles are not intelligent animals. They are diggers. Thus, when they meet an obstacle such as provided by the present invention, they are unable to overcome it. If a tunnel is blocked off, they don't bypass the obstacle and go around it. Digging tunnels requires considerable energy. By depriving them of food and their living quarters, they are unable to survive. The device and method of the present invention device takes away their habitat and home and forces them to move elsewhere.

A device of the present invention is preferably able to be easily mass-produced. For instance, cutting a 4 foot×8 foot sheet of soft particle board could produce the bodies and penetrating ends of approximately 425 devices, with spiked projections such as staples, nails, double-pointed nail, tacks and so forth added before or after the cutting, depending on the mode of manufacture. Molding plastic devices of the present invention may be achieved with conventional methods.

The spiked projections may be added for instance by driving tacks or nails through one or both surfaces of the device, or by using for instance double sided nails. In one embodiment of the present invention, an air nailer may be used to drive the blunted end of a nail through one of the facing surfaces of a body of a device of the present invention, so that the pointed end of the nail protrudes through the surface in the desired position and direction. Hail heads are preferably sufficiently embedded in the opposing facing surface of the device to withstand any pressure a mole could present. In addition, by having 6-9 nails embedded easily compensates for any loss of a nail or two; preferably, at least 4 nails are present on at least one side of the device. The points are preferably very sharp, and at least sharp enough to prevent the mole from digging the device out of the tunnel.

The introduction of a double pointed nail as spiked projections projecting from both facing sides of a body of a device of the present invention may be used to make a device of the present invention. Preferably, this would be a single-step operation. Pushing the double pointed nail halfway through the device would permit sharp points to project from both sides.

The number of spiked projections on the device is variable depending on the nature of the animals being dealt with. There are large moles and small moles, and other large and small burrowing animals. Also, the placement of the spears is variable.

A preferred embodiment of the present method is as follows. First, the area of mole activity is examined and signs of the freshest activity identified (new elevations, freshly disturbed dirt). After it has been established that a tunnel appears fresh, follow it to its end. Position and insert a device at the end of the tunnel. This prevents the mole from extending the tunnel and causing further damage. After pressing dirt down around the device, begin retracing the tunnel back to its source. Press the tunnel roof down to ground surface level by stepping on the tunnel roof. Do not stomp the roof down as this could further damage the root system. Flattening the tunnel to surface level permits the roots, which had been torn loose by the mole, to reestablish contact with the dirt floor. Follow-up watering will aid the grass to further reestablish itself thus reducing mole damage. Continue following and flattening the tunnel towards its source, pounding units into the tunnel every 6-8 feet as you proceed. By doing this, in case the mole happens to be in the tunnel, it will be trapped in a 6-8 foot length of tunnel. This will not provide sufficient food for survival and the additional work of reopening the tunnel from being flattened will add an additional hardship and strain on the animal. Moles are high energy creatures due to the nature of their work so any interference with their food supply and additional effort will quickly affect them.

Follow the tunnel to where it has a juncture with another tunnel. Block the tunnel entrance with a unit and block the new tunnel with a unit on either side of the junction. Continue flattening tunnels as this will make it much easier to determine new, fresh mole activity the next day.

The trapped mole will attempt to dig new tunnels after being denied use of the other tunnels. New ones will be easy to discern. Repeat the same process the next day as the previous day. Drive in units at the tunnel entrance and the tunnel end or vice versa. Continue driving units every 6-8 feet to again deny moles access to food supply and means to travel to its den. Continue flattening the tunnels so mole activity is more easily discerned the following day. By the third day, there is typically much less tunneling activity, however, preferably the same procedure is followed on the $3^{rd}$ day as previously described. As mentioned below in Example 2, mole activity ceased within 4 days of first application of a device in accordance with this invention.

As moles tunnel, they frequently dig dens. They can be identified by a mound of dirt on the surface of the ground. This can be a center for mole activity. Begin digging into the mound of dirt with a trowel and also use a stick to probe into the dirt for the tunnel or den opening. When the probe strikes a tunnel or den opening, there will be less resistance. Remove the dirt and uncover the tunnel. Follow it toward the center of the mound. There will be 3 tunnels. One coming in from the left, one from the right and one going down. Drive in a unit and block each tunnel. Press dirt firmly over each unit making certain all are firmly covered with dirt. This will block entering or leaving the den and use of the joining tunnels. Those in the den will not be able to leave and those outside will not be able to enter thus rendering the den useless to them and possibly reducing their ability to survive.

Example 1

A body and penetrating end of a device similar to that of the present invention was made of cedar wood (cedar shingle) about ¼ inches thick and having two flat surfaces, essentially as shown in FIG. 2A and FIG. 2B. However, the device did not include any spiked projections (hereafter, "non-spiked device"). The non-spiked device was driven perpendicularly into mole tunnels, to block mole passage through the tunnels. The device did not work; the moles were able to nudge the non-spiked device up and out of the tunnel, removing the blockage and resuming their normal activity.

Example 2

As the moles will use their nose and paws to force blocking devices from the tunnels, as indicated in Example 1 above, a non-spiked device was modified to include spiked projections to prevent moles from removing the blocking device. 9 sharp tacks were driven approximately perpendicularly through both broad flat ("facing") sides of the cedar wood to form 9 spiked projections jutting about ½ inch from either side ("spiked device"). The placement of the spiked projections on both facing surfaces was similar to that illustrated in FIG. 2A, with accommodation made for the heads of the tacks. Once inserted into the ground, the pointed, spiked ends of the tacks projected in both directions parallel to the tunnel floor (approximately 90 degrees from the surface of the facing surface). When the moles used the tunnel, they encountered the sharp points and were not able to remove the devices presumably because of discomfort caused by the sharp spikes. Ultimately, this blocked off the mole's use of the tunnels and dens.

The spiked devices were designed to be sufficiently large (dimensioned as in FIGS. 2A and 2B) so they could be easily hammered down into the floor of the tunnel and wide enough to block and be secured by the tunnel walls and block a den entrance. Once the devices were inserted into the ground, the top of the mole tunnel was pressed down over the device and the tunnel ceiling pushed down on both the first facing and second facing surfaces of the device to give it more support, in case the moles attempted to push it from either direction.

In the first use of these devices, a couple more instances of mole tunnel digging activity occurred. The new tunnels were similarly blocked by spike-studded devices. After 2 other different episodes of mole activity and subsequent introduction of the devices, all mole activity ceased and no further mole tunnel activity occurred in the area.

In a second and third use of these devices, where a spike-studded device was employed in a manner similar to that described above, within 4-5 days all mole activity ceased in that area, with no further activity following. Without being bound by theory, it appeared the moles were being starved out by restricting their access to their tunnels and dens. Moles have a high energy necessity, and cannot survive in a limited food source area. The moles have not reappeared elsewhere in the area.

Overall, in this Example, the device and method of the present invention halted mole activity within 3-5 days in 3 different areas where active mole tunnels were present. The method included identifying a series of mole tunnels, compressing the tunnels with a person's shoe, and positioning and inserting the spiked devices at approximately 8 foot intervals up to tunnel openings to the ground surface. After 1 day, the mole tunnel area was checked for further mole activity, and the method reapplied to areas with evidence of fresh mole activity (newly visible tunnel mounds and disturbed grass on the earth surface, freshly turned soil). On the second and third days, the mole tunnel areas were checked and spiked devices were again added as needed, if needed; by the fourth day, no further activity was noted and no further devices inserted into the ground. For each tunnel area, 10-20 devices was used to halt mole activity. The areas were checked 1 week and 1 month later; no mole activity was resumed in that area. It appeared that the moles abandoned those tunnels or died within them, although no mole carcasses were found in the defunct tunnels.

Example 3

Other embodiments of the present invention were made from hardened particle board (¼ inch thick) according to the devices pictured in FIGS. 5A and 5B and accompanying discussion (device body and penetrating end dimensions as indicated in FIGS. 2A and 2B and accompanying discussion), with wide crown ½ inch staples (staple spikes/points spaced about ½ inch apart) and 7/16 inch spikes used to make projected spikes of the present invention. The spiked projections were approximately ¼ inch long (7/16 inch long spike on naked staple–3/16 inch hardened thick particle board=approximately 4/16 inch=approximately ¼ inch long spiked projections).

The invention claimed is:
1. A device comprising a body and a penetrating end;
wherein the body has a top pounding surface, a bottom surface, a first facing surface and a second facing surface, each facing surface facing away from the other and having a width of about 1.75 inches to about 5 inches and a height of about 1.75 inches to about 5 inches; and
wherein the penetrating end is attached to the bottom surface of the body and wherein the penetrating end has the same or a narrower thickness than the body of the device, or is pointed, and wherein the penetrating end has a narrower width than portions of the body located above the penetrating end;
wherein the first facing surface comprises from 4 to 200 spiked projections that project away from the first facing surface; and
wherein the second facing surface comprises 4 to 200 spiked projections that project away from the second facing surface.
2. The device according to claim 1, wherein the first facing surface, the second facing surface, or both facing surfaces, comprise from 5 to 30 spiked projections.
3. The device according to claim 1, wherein each spiked projection projects away from the first or second facing surface at an angle of about 70 to 110 degrees.
4. The device according to claim 3, wherein said angle is about 80 to 100 degrees.
5. The device according to claim 1 wherein said penetrating end is shaped into a point or a stake.
6. The device of claim 5, wherein said penetrating end tapers in thickness toward said point or stake and/or is serrated.
7. The device according to claim 1 wherein said body and penetrating end are made of wood, a hard metal, a hard metal alloy, plastic, biodegradable plastic, hard particle board, soft particle board, or a composite material that simulates natural rock, cement or pebbles adhered together.
8. The device according to claim 1 wherein said spiked projections are made of plastic, a metal or a metal alloy.

9. The device according to claim 8 wherein said spiked projections are made with a tack, nail, double-pointed nail or staple.

10. The device of claim 1, wherein said spiked projections extend about 1/8 to about 1 inch from the facing surfaces.

11. The device of claim 10, wherein said spiked projections extend about 1/4 to about 3/4 inch from the facing surfaces.

12. A method of halting mole tunneling activity comprising the steps of:
 (a) identifying a mole tunnel; and
 (b) blocking the tunnel with the device of claim 1 so that the spiked projections on the device project into the tunnel and a mole cannot pass the device of claim 1.

13. The method of claim 12, wherein said blocking step (b) comprises positioning and inserting at least two of said devices of claim 1 in different portions of the mole tunnel.

14. The method of claim 13,
 wherein said identifying step (a) further comprises identifying one or more ends of the mole tunnel, and said blocking step (b) further comprises positioning and inserting one of said two devices of claim 1 to block each identified tunnel end, and positioning and inserting additional ones of said devices of claim 1 at regular intervals of about 5 to 15 feet between the tunnel ends.

15. The method of claim 14, wherein said additional ones of said devices are inserted every 6 to 8 feet along the identified mole tunnel.

16. The method of claim 14, wherein said identifying step (a) further comprises identifying mole tunnels in a given area on a first day, a second day, and a third day, and positioning and inserting the devices of claim 1 into areas of new activity as needed on each day.

17. The method of claim 12, wherein a mole den and associated tunnels are identified in identifying step (a), and step (b) comprises positioning and inserting the device of claim 1 into each tunnel leading into the den so that the spiked projections on the device project into the den.

18. The method of claim 12, further comprising a step after step (a) of compressing dirt on the identified tunnels.

\* \* \* \* \*